United States Patent Office 3,833,680
Patented Sept. 3, 1974

3,833,680
PAINTING COMPOSITION
Michiaki Torii, Tokyo, Japan, assignor to Nippon Petrochemicals Company, Limited, Tokyo, Japan
No Drawing. Filed Mar. 26, 1973, Ser. No. 344,772
Claims priority, application Japan, Mar. 27, 1972, 47/29,705
Int. Cl. C08c 11/22, 13/04
U.S. Cl. 260—735
6 Claims

ABSTRACT OF THE DISCLOSURE

A painting composition containing a chlorine-containing polymer selected from the group consisting of chlorinated rubber and chlorine-containing synthetic resin, and at least one of compounds represented by the formula (I):

$$Ar_1—R—Ar_2—R—Ar_3 \quad (I)$$

wherein R is alkylene selected from the group consisting of

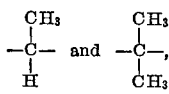

and any one of $Ar_1$, $Ar_2$, and $Ar_3$ is alkylphenyl ($Ar_1$ or $Ar_3$) or alkylphenylene ($Ar_2$), said alkyl having 1–3 carbon atoms, the number of alkyl radicals being 1–3, and the number of carbon atoms contained in all of the alkyls being 1–3, alternatively any two of $Ar_1$, $Ar_2$, and $Ar_3$ are phenyl or tolyl ($Ar_1$ and/or $Ar_3$), or phenylene or methylphenylene ($Ar_2$).

BACKGROUND OF THE INVENTION

1. Field of the Invention

This invention relates to a painting composition. More particularly, it relates to a painting composition produced by using as a base a chlorinated rubber or chlorine-containing synthetic resin such as polyvinyl chloride, chlorinated polyolefin or vinyl chloride copolymer and mainly used as an anticorrosive paint for ships or structures on land.

2. Description of the Prior Art

Paints obtained from chlorinated rubber or chlorine-containing synthetic resin are generally used in the bottom, exterior, deck and superstructure of a ship as anticorrosive paints and particularly as paints for ships placed under the severe corrosive action. Moreover, paints using chlorinated rubber system or those using chlorine-containing synthetic resin system such as chlorinated polyethylene, polyvinyl chloride system, or vinyl chloride copolymer have long been used as paints for retaining water and chemicals resistances so as to obtain good results in painting not only ships but also structures on land. Further, these paints more easily form a thick layer than the vinyl resin type paint, and, even if painted repeatedly on the previously painted surface after drying, the solvent and vehicle contained therein more increase the adhesion of the old layer to the new layer. Thus, these paints are most appropriate also for coating in a repair work wherein an extremely quick drying character is required.

Chlorinated rubber type or chlorine-containing synthetic resin type paints have been manufactured heretofore by various processes. These paints are broadly divided into paints of pure type formed by combining chlorinated rubber or chlorine-containing synthetic resin with plasticizer and those of blend type using other synthetic resin such as alkyd resin and various varnishes together with the above combination. If only chlorinated rubber or chlorine-containing synthetic resin bases are employed, the painted layer is hard to be formed and cracks easily take place in the layer. To prevent such disadvantages, it is necessary to use a considerable amount of plasticizer.

As plasticizers, chlorine compound type plasticizers such as polychlorinated biphenyl (PCB), chlorinated paraffin and triphenyl chloride have been generally used heretofore.

Such chlorine compounds, however, are toxic ones which are taken into and accumulated in the human body to cause various evils. In addition, these compounds are very harmful to human life as environment-polluting materials because they are highly stable and difficult to decompose. As a result of using a large quantity of plasticizer such as PCB for anticorrosive paints of ships, much plasticizer flows into sea-water thereby causing problems of environmental pollution.

Accordingly, there has been demanded as a chlorinated rubber and chlorine-containing synthetic resin type paint a painting composition which contains a harmless stabilizer having good compatibility with the painting base as well as excellent water and chemicals resistances and durability. For that purpose, various plasticizers for paints including, for example, phthalate ester type or phosphate ester type or ester of aliphatic acid have been studied, but these plasticizers have various drawbacks such as poor water resistance and difficulty in obtaining a satisfactory layer.

SUMMARY OF THE INVENTION

The object of this invention consists in providing a painting composition containing a novel hydrocarbon system plasticizer which is devoid of chlorine, highly safe with completely no toxic property of, for example, polychlorinated biphenyl (PCB), excellent in compatibility with chlorinated rubber and chlorine-containing synthetic resin, devoid of volatility, and good in plasticizing efficiency.

DESCRIPTION OF THE INVENTION

The painting composition of this invention contains chlorinated rubber or chlorine-containing synthetic resin, and, as a plasticizer, one or more of compounds represented by the following formula (I):

$$Ar_1—R—Ar_2—R—Ar_3 \quad (I)$$

wherein R is

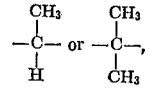

and any one of $Ar_1$, $Ar_2$, and $Ar_3$ is alkylphenyl ($Ar_1$, $Ar_3$) or alkylphenylene ($Ar_2$), said alkyl having 1–3 carbon atoms, the number of alkyl radicals being 1–3, and the number of carbon atoms contained in all of the alkyls being 1–3, alternatively any two of $Ar_1$, $Ar_2$, and $Ar_3$ are phenyl or tolyl ($Ar_1$, $Ar_3$), or phenylene or methylphenylene ($Ar_2$).

The process for producing the compound represented by the formula (I) may include a method for reacting a lower alkylbenzene selected from the group consisting of toluene, ethyl benzene, xylene, methylethyl benzene, trimethyl benzene, isopropyl benzene, n-propyl benzene and mixtures thereof with phenylmethyl carbinols, a method by Friedel-Crafts reaction and, more desirably, a method for reacting styrene or α-methyl styrene with the above lower alkyl benzene by using sulfuric acid catalyst. If, for example, xylene reacts with styrene by using sulfuric acid catalyst, it is inferable by gas chromatography, NMR and ether means that the compounds represented by the following formulae (II)—(IV) together with other isomers can be obtained:

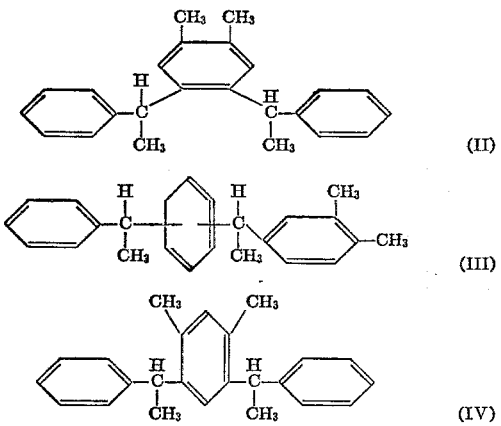

From ortho-xylene and styrene, there can be obtained a mixture of the compounds (II) and (III), and the ratio of (II) to (III) varying depending upon the condition of production. From meta-xylene and styrene, the compound (IV) can be obtained. From mixed xylene, a mixture of (II), (III) and (IV) can be obtained.

The compound represented by the formula (I) can be obtained by various methods and a mixture of isomers falling under the formula (I) is obtainable as the method of production varies.

The compound of the formula (I) to be used for the object of this invention may be a single compound or a mixture.

The compound represented by the formula (I) makes an excellent plasticizer when used in chlorinated rubber or chlorine-containing synthetic resin paint and particularly in anti-corrosive paint.

Among the compounds represented by the formula (I), those indicated by the formula (II)–(IV) are industrially easily preparable and showing excellent painting properties. Of course, however, other compounds indicated by the formula (I) also have good painting properties.

When using as a paint the painting composition of this invention, resins such as alkyd resin, cumarone-indene resins, petroleum resins, phenolic resins and rosin as well as solvents, pigments and others are appropriately added in order to improve workability, weathering resistance and other properties according to the purpose and the place of use. 10–50 parts by weight of the compound represented by the formula (I) can be used as a plasticizer on the basis of 100 parts by weight of chlorinated rubber and/or chlorine-containing synthetic resin.

The increase in the amount of plasticizer lowers water and chemicals resistances which constitute characteristic features of the base used. Moreover, if the plasticizer is small in quantity, properties of the paint are also influenced disadvantageously by cracks formed in the painted layer. Typical chlorine-containing synthetic resin type paint bases include chlorinated polyolefin such as chlorinated polyethylene and chlorinated polypropylene as well as polyvinyl chloride and vinyl chloride copolymer.

DESCRIPTION OF PREFERRED EMBODIMENTS

Example 1

A mixed xylene (o: 95%, m: 2%, p: 2% and ethylbenzene 1%) was reacted with styrene in the presence of 95% $H_2SO_4$ at a temperature of 5–10° C. Then, a fraction which was a mixture mainly composed of compounds represented by the above formulae (II)–(IV) and which had a boiling point within the range of 360–390° C. (760 mm. Hg) was separated from this reaction mixture. The fraction is referred to as Sample 1.

The fraction having a boiling point within the range of 192–225° C. (at 2 mm. Hg) which was obtained by replacing styrene with mixed vinyl toluene in the process for preparing Sample 1 is referred to as Sample 2.

The $C_9$ fraction obtained from the catalytic reformer of naphtha (the fraction is composed of 2.81% xylene, 1.17% isopropyl benzene, 4.37% n-propyl benzene, 31.12% meta- and para-ethyl benzenes, 8.53% 1,3,5--trimethyl benzene, 7.36% ortho-ethyl toluene, 33.78% 1,2,4-trimethyl benzene, 7.68% 1,2,3-trimethyl benzene, and 3.21% other components) was diluted with steam and subjected to dehydrogenation reaction at 600° C. by using dehydrogenation catalyst Shell 105 (trademark of Shell) mainly composed of iron oxide. The resulting mixture containing α-methyl styrene and vinyl toluenes) reacted as it was under the same condition as that of Sample 1. The fraction separated from the resulting product and having a boiling point within the range of 193–231° C. (at 2 mm. Hg) is referred to as Sample 3.

Properties of the chlorinated rubber type painting composition containing these three Samples 1–3 were compared with those of the prior chlorinated rubber system painting composition containing PCB, chlorinated paraffin, tricresyl phosphate (TCP), or butyl benzyl phthalate (BBP). The composition ratios of the products were shown in Table 1.

TABLE 1

|  | Weighted percent | |
|---|---|---|
|  | Composition A | Composition B |
| Chlorinated rubber | 28.57 | 21.74 |
| Alkyd resin modified by linseed oil | 12.29 | 9.35 |
| Plasticizer | 11.42 | 8.69 |
| Solvent (xylene and $C^9$ aromatic hydrocarbon) | 47.72 | 36.30 |
| Pigment |  | 23.92 |

Tests for measuring properties of the product were mainly conducted according to JIS K–5400 and JIS K–5401. The test results were shown in Table 2. Data appearing in test items ranging from pencil hardness to acid resistance in the Table 2 are values obtained by measuring composition A while those appearing in test items ranging from specular gloss to weathering resistance are values obtained by measuring composition B. The characteristics of the painting composition by this invention appearing in respective test items are as follows:

(1) Pencil hardness (JIS K–5401): The hardness of layer of the product by this invention was higher than that of the prior product using chlorinated paraffin, TCP, and BBP.

(2) Cross cut test (JIS K–5400): The product by this invention was superior in adhesive property to the prior product using chlorinated paraffin, TCP, and BBP.

(3) Water resistance (JIS K–5400): When using the prior product containing chlorinated paraffin, TCP, and BBP, the surface of the metal was rusted and the water resistance being also poor. On the other hand, the product by this invention brought about neither rusting nor swelling.

(4) Alkali resistance (JIS K–5400): The product by this invention was excellent in alkali resistance similarly to the prior product using chlorinated paraffin or TCP, while the prior product employing BBP was poor in the resistance since BBP partially passed into the alkali solution.

(5) Benzine resistance (JIS K–5400): The product by this invention was similar to the prior product in this property.

(6) Acid resistance (JIS K–5400): The product by this invention was excellent in this property similarly to the prior product.

(7) Specular gloss (JIS K–5400): After drying the product by this invention at normal temperature, the specular gloss on the mirror surface at an angle of 60° was measured. The specular gloss of this product was 92.8% in reflection ratio, while that of the prior product remained within the range of above 80% and below 90%.

(8) Adaptabilities for repeated painting and for upper painting (JIS K–5400, respectively): The product by this invention was more excellent than the prior product in these properties.
(9) Weathering resistance (JIS K–5400): As a result of the accelerated aging test conducted by using Weather-O-Meter (200 hrs.; 60° C.), it was found that the product by this invention became less yellow than the product using chlorinated paraffin and TCP. Even after 200 hrs., the specular gloss of this product was more excellent than that of the product using other plasticizer. The rate of decrease in the specular gloss of this product was lower than that of the prior product.

As is clear from the test results as stated above, it is found that the product by this invention is excellent not only in respective test items but also on the whole evaluation. Same results were obtained also by using chlorinated polyethylene as a chlorine-containing synthetic resin instead of chlorinated rubber.

and $Ar_3$ being from 1 to about 3 and the maximum number of carbon atoms contained in all alkyl groups in each of $Ar_1$, $Ar_2$ and $Ar_3$ being 3.

2. A painting composition according to Claim 1 wherein the plasticizer comprises a mixture comprised of compounds in which:

(A) R is
$Ar_1$ and $Ar_3$ are each phenyl; and $Ar_2$ is cresylene; and
(B) R is
$Ar_1$ is phenyl; $Ar_2$ is phenylene; and $Ar_3$ is ortho cresyl.

TABLE 2.—TEST RESULTS

| | Plasticizer | | | | | | |
|---|---|---|---|---|---|---|---|
| | Example | | | Comparative example | | | |
| | Product of this invention (Sample No.) | | | Chlorinated paraffin | | TCP (Tricresyl-phosphate) | BBP (Butyl-benzyl-phthalate) | Reference example |
| Test items (Pencil hardness: by JIS K5401, other items: by JIS K5400 | 1 | 2 | 3 | 40 | 70 | | | PCB |
| Pencil hardness on— | | | | | | | | |
| The fourth day | 3B | 3B | 3B | B | HB | 2B | 3B | HB |
| The tenth day | HB | HB | B | F | F | B | B | F |
| Cross cut test spots; After 6 days | 8 | 8 | 7 | 7 | 8 | 6 | 6 | 8 |
| Tape test (rate of preservation percent) | 100 | 99 | 98 | 98 | 98 | 96 | 95 | 100 |
| Water resistance: | | | | | | | | |
| 3 days | ○ | ○ | ○ | ○ | X | △ | △ | △ |
| 6 days | ○ | ○ | ○ | △ | X | △ | △ | △ |
| Salt water resistance (by immersing in 3% NaCl): | | | | | | | | |
| 3 days | ○ | ○ | ○ | △ | X | △ | △ | ○ |
| 6 days | ○ | ○ | ○ | △ | X | △ | △ | ○ |
| Alkali resistance (5% NaOH); 1 day | ○ | ○ | ○ | ○ | ○ | ○ | X | △ |
| Benzine resistance (benzine 8, toluene 2); 5 hours | △ | △ | △ | X | △ | X | △ | ○ |
| Acid resistance (20% $H_2SO_4$): | | | | | | | | |
| 3 days | ○ | ○ | ○ | ○ | ○ | ○ | ○ | ○ |
| 6 days | ○ | ○ | ○ | ○ | ○ | ○ | ○ | ○ |
| Specular gloss; Reflection ratio at an angle of 60°, percent | 92.8 | 90.3 | 88.0 | 86.8 | 86.2 | 81.7 | 87.8 | 87.7 |
| Adaptability for repeated painting | (1) | (1) | (1) | (1) | (1) | (1) | (1) | (1) |
| Adaptability for upper painting | (1) | (1) | (1) | (1) | (1) | (1) | (1) | (1) |
| Weathering resistance (Weather-O-Meter, 200 hrs.: 60° C.): | | | | | | | | |
| Degree of becoming yellow | 0.012 | 0.014 | | 0.010 | 0.016 | 0.016 | 0.002 | 0.014 |
| Specular gloss (reflection ratio at an angle of 60°) | 86 | 84 | | 82 | 82 | 68 | 62 | 82 |

[1] Good.

NOTE.—○=satisfactory: △=ordinary: X=inferior.

Example 2

The results obtained by the test for comparing the acute toxicity of the plasticizer used in this invention with that of PCB (polydiphenyl chloride) are shown in Table 3. From this table, it is found that the product by this invention is very low in toxic character.

Table 3

| | The product of this invention (1,2-bis-α-methylbenzyl - 4,5 - dimethylbenzene) | PCB |
|---|---|---|
| LD$_{50}$ (oral administration) | | |
| Rat | 10.19 g./kg. | |
| Mouse | 1.8 g./kg. | |

I claim:

1. A painting composition comprising chlorinated rubber and 10 to 50 parts by weight per 100 parts of chlorinated rubber of at least one plasticizer of the formula:

$$Ar_1—R—Ar_2—R—AR_3$$

wherein R is alkylene selected from the group consisting of

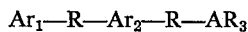

$Ar_1$ and $Ar_3$ are each selected from the group consisting of phenyl and lower alkylphenyl; and $Ar_2$ is selected from the group consisting of phenylene and lower alkylphenylene; the total number of alkyl groups in each $Ar_1$, $Ar_2$ 3. A painting composition according to Claim 1 wherein the plasticizer comprises a compound in which R is

$Ar_1$ and $Ar_3$ are each phenyl; and $Ar_2$ is meta cresylene.

4. A painting composition according to claim 1 wherein the plasticizer comprises a mixture of compounds in which:
(A) R is

$Ar_1$ and $Ar_3$ are each phenyl; and $Ar_2$ is ortho-dimethyl phenylene;
(B) R is

$Ar_1$ is phenyl; $Ar_2$ is phenylene; and $Ar_3$ is ortho-dimethyl phenyl;
(C) R is

Ar₁ and Ar₃ are each phenyl; and Ar₂ is meta-dimethyl phenylene;
(D) R is

Ar₁ is phenyl; Ar₂ is phenylene; and Ar₃ is meta-dimethyl phenyl;
(E) R is

Ar₁ and Ar₃ is phenyl; and Ar₂ is ethyl phenylene;
(F) R is

Ar₁ is phenyl; Ar₂ is phenylene; and Ar₃ is ethyl phenyl.

5. A painting composition according to claim 1 wherein the plasticizer comprises a mixture consisting of compounds in which:
(A) R is

Ar₁ and Ar₃ are each phenyl; and Ar₂ is trimethyl, methyl-ethyl, iso-propyl, or n-propyl phenylene;
(B) R is

Ar₁ and Ar₃ are each phenyl; and Ar₂ is trimethyl, methyl-ethyl, iso-propyl or n-propyl phenylene;
(C) R is

Ar₁ and Ar₃ are each methyl phenyl; and Ar₂ is trimethyl, methyl-ethyl, iso-propyl or n-propyl phenylene;
(D) R is

Ar₁ is methyl phenyl; Ar₂ is methyl phenylene; and Ar₃ is phenyl.

6. A painting composition according to claim 1 wherein the plasticizer comprises a mixture consisting of compounds in which:
(A) R is

Ar₁ and Ar₃ are each methyl phenyl; and Ar₂ is ortho-dimethyl phenylene;
(B) R is

Ar₁ and Ar₃ are each methyl phenyl; and Ar₂ is meta-dimethyl phenylene;
(C) R is

Ar₁ and Ar₃ are each methyl phenyl; and Ar₂ is ethyl phenylene;
(D) R is

Ar₁ is methyl phenyl; Ar₂ is methyl phenylene; and Ar₃ is ortho-dimethyl phenyl;
(E) R is

Ar₁ is methyl phenyl; Ar₂ is methyl phenylene; and Ar₃ is meta-dimethyl phenyl;
(F) R is

Ar₁ is methyl phenyl; Ar₂ is methyl phenylene; and Ar₃ is ethyl phenyl.

References Cited
UNITED STATES PATENTS

| | | | |
|---|---|---|---|
| 3,069,478 | 12/1962 | McLaughlin | 260—668 C |
| 2,402,189 | 6/1946 | Soday | 260—735 |
| 2,772,172 | 11/1956 | Carson | 260—735 |

OTHER REFERENCES

Rubber World—Materials and Compounding Ingredients for Rubber and Plastics (Pub. Printing Co.) (Louisville, Ky.) (1965), pp. 273–276 and 321. TS 1890 153.

ALLAN LIEBERMAN, Primary Examiner

H. H. FLETCHER, Assistant Examiner

U.S. Cl. X.R.

260—33.6 UA, 668 R, 668 C, 736, 738

UNITED STATES PATENT OFFICE
CERTIFICATE OF CORRECTION

PATENT NO. : 3,833,680
DATED : September 3, 1974
INVENTOR(S) : Michiaki Torii

It is certified that error appears in the above-identified patent and that said Letters Patent are hereby corrected as shown below:

Table 3 at Column 5, lines 53-59 should read as follows:

| | |
|---|---|
| The product of this invention (1,2-bis-a-methylbenzyl-4,5-dimethylbenzene) | LD50 (rat, oral administration) 10.19 g/kg |
| PCB | LD50 (mouse, oral administration) 1.8 g/kg |

Signed and sealed this 29th day of April 1975.

(SEAL)
Attest:

RUTH C. MASON
Attesting Officer

C. MARSHALL DANN
Commissioner of Patents and Trademarks